(12) United States Patent
Jagannath et al.

(10) Patent No.: US 10,394,788 B2
(45) Date of Patent: Aug. 27, 2019

(54) SCHEMA-FREE IN-GRAPH INDEXING

(71) Applicant: International Business Machines Corporation, Armonk, NY (US)

(72) Inventors: Srikanta B. Jagannath, Bangalore (IN); Sriram Lakshminarasimhan, Bangalore (IN); Sameep Mehta, Bangalore (IN); Sumit Neelam, Bangalore (IN)

(73) Assignee: International Business Machines Corporation, Armonk, NY (US)

(*) Notice: Subject to any disclaimer, the term of this patent is extended or adjusted under 35 U.S.C. 154(b) by 263 days.

(21) Appl. No.: 15/343,801

(22) Filed: Nov. 4, 2016

(65) Prior Publication Data

US 2018/0129690 A1    May 10, 2018

(51) Int. Cl.
*G06F 17/30* (2006.01)
*G06F 16/22* (2019.01)
*G06F 16/21* (2019.01)
*G06F 16/2453* (2019.01)

(52) U.S. Cl.
CPC ........ *G06F 16/2272* (2019.01); *G06F 16/211* (2019.01); *G06F 16/2453* (2019.01)

(58) Field of Classification Search
None
See application file for complete search history.

(56) References Cited

U.S. PATENT DOCUMENTS

| | | | |
|---|---|---|---|
| 7,974,978 B2 | 7/2011 | Yan et al. | |
| 9,158,599 B2 * | 10/2015 | Doerpmund | G06F 9/54 |
| 9,390,174 B2 * | 7/2016 | Zhou | G06F 17/30864 |
| 9,754,210 B2 * | 9/2017 | Xia | G06F 16/951 |
| 2011/0173189 A1 | 7/2011 | Singh et al. | |
| 2015/0249669 A1 | 9/2015 | Gamage et al. | |
| 2015/0310073 A1 * | 10/2015 | Chakrabarti | G06F 16/2465 707/722 |
| 2016/0140154 A1 | 5/2016 | Finis et al. | |
| 2017/0147710 A1 * | 5/2017 | Lai | G06F 17/30973 |
| 2018/0085967 A1 * | 3/2018 | Bindhammer | B27B 25/10 |

OTHER PUBLICATIONS

Wikipedia, B-tree, https://en.wikipedia.org/w/index.php?title=B-tree&oldid=738369059 Sep. 8, 2016.
Wikipedia, Lucene, https://en.wikipedia.org/w/index.php?title=Lucene&oldid=738574646, Sep. 9, 2016.
Wikipedia, Neo4J, https://en.wikipedia.org/w/index.php?title=Neo4j&oldid=740381449, Sep. 20, 2016.
Broecheler, M. Titan—Big Graph Data With Cassandra, 2012.

* cited by examiner

*Primary Examiner* — Debbie M Le
(74) *Attorney, Agent, or Firm* — Ryan, Mason & Lewis, LLP

(57) ABSTRACT

Methods, systems, and computer program products for schema-free in-graph indexing are provided herein. A computer-implemented method includes creating multiple indexes directed to data within a knowledge graph; correlating two or more of the created indexes, thereby generating one or more multi-dimensional indexes; determining, based on a received query, one or more traversal paths within the data of the knowledge graph and the generated multi-dimensional indexes, wherein the traversal paths facilitate processing of the query; and outputting a response to the query based on the determined traversal paths.

16 Claims, 5 Drawing Sheets

SCHEMA-FREE IN-GRAPH INDEXING

FIELD

The present application generally relates to information technology, and, more particularly, to graph indexing techniques.

BACKGROUND

As knowledge graphs (that is, graph structures with attributes on vertices and edges) have become increasingly popular, efficient retrieval of information from large interconnected data has become increasingly challenging. While existing graph databases can be tuned for queries that explore relationships, the performance of analytics operations involving constraints on attributes associated with the traversal is commonly lacking. Further, existing external indexing engines cannot be effectively used directly with knowledge graphs.

SUMMARY

In one embodiment of the present invention, techniques for schema-free in-graph indexing are provided. An exemplary computer-implemented method can include creating multiple indexes directed to data within a knowledge graph, and correlating two or more of the created indexes, thereby generating one or more multi-dimensional indexes. Such a method can also include determining, based on a received query, one or more traversal paths within the data of the knowledge graph and the generated multi-dimensional indexes, wherein the traversal paths facilitate processing of the query, and outputting a response to the query based on the determined traversal paths.

In another embodiment of the invention, an exemplary computer-implemented method can include obtaining a query pertaining to data encompassed within a knowledge graph, creating multiple single-dimension indexes directed to data within the knowledge graph, and correlating, based on the query, two or more of the created single-dimension indexes, thereby generating one or more multi-dimensional indexes. Such a method can also include determining, based on the query, one or more traversal paths within the data of the knowledge graph and the generated multi-dimensional indexes, wherein the traversal paths facilitate identification of a response to the query, and outputting the response to the query to at least one user.

Another embodiment of the invention or elements thereof can be implemented in the form of a computer program product tangibly embodying computer readable instructions which, when implemented, cause a computer to carry out a plurality of method steps, as described herein. Furthermore, another embodiment of the invention or elements thereof can be implemented in the form of a system including a memory and at least one processor that is coupled to the memory and configured to perform noted method steps. Yet further, another embodiment of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

Figure 1:
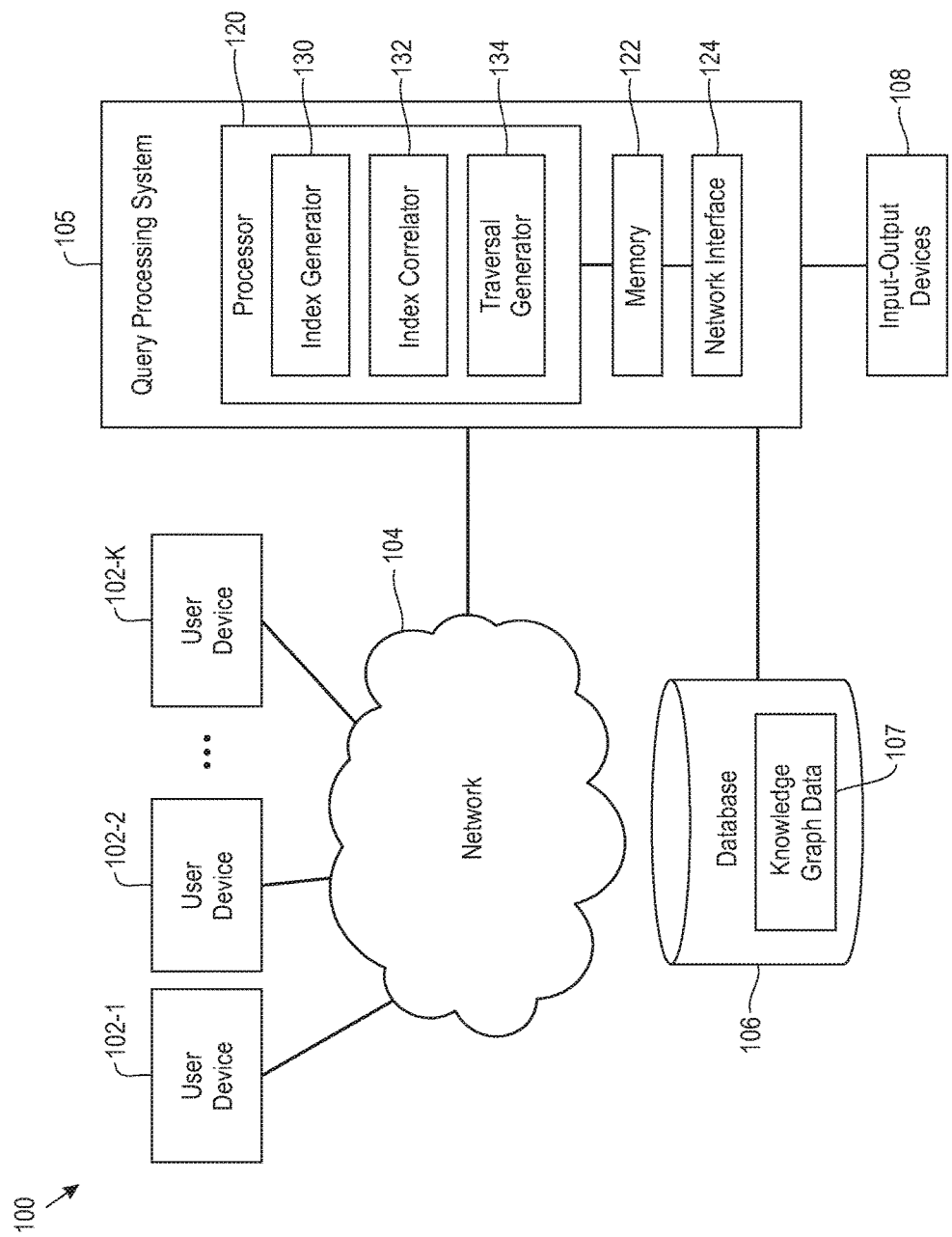
FIG. 1 is a block diagram of a computer network configured for schema-free in-graph indexing in an illustrative embodiment of the invention.

As described herein, an embodiment of the present invention includes schema-free in-graph indexing. As used herein, "schema-free" refers to a lack of a fixed set of attributes, as well as a lack of constraints on adding edges and/or vertices. At least one embodiment of the invention includes implementing an indexing engine, within a graph database system itself, which provides flexibility and control to users, as well as the ability to optimize graph analytics using the relevant indexes.

Additionally, one or more embodiments of the invention include accelerating graph analytics using a schema-free indexing system. Such an embodiment can include creating a schema-free in-graph index that points to data (the vertices and/or edges of a given knowledge graph, for example), and correlating multiple indexes to create multi-dimensional indexes. Accordingly, such an embodiment of the invention can include facilitating general indexes that can involve both structures and values. By way merely of example, frequent sub-graph index and hierarchical data are instances of the type of index that can be supported by such an embodiment.

Also, at least one embodiment of the invention includes using data to generate one or more indexes, and carrying out index-to-index traversals to accelerate query processing. Accordingly, in connection with such an embodiment, there is no need to use an external indexing engine, as the one or more indexes are treated as data within the graph system. Additionally, such an embodiment also includes providing flexibility in creating new types of indexes. Examples of index types include, but are not limited to, value-based indexes, structure-based indexes and any combination thereof that would improve retrieval of subgraphs from the original data graph.

Further, one or more embodiments of the invention can include tuning and/or tailoring query optimization on top of the generated indexes based on the specific indexes that are generated. Query optimization can include, for example, re-writing queries to traverse the indexes rather than the original data, (quickly) pruning candidates for the query result, and reducing the amount of data accessed. As detailed further herein, one or more embodiments of the invention can include maintaining statistics information on index nodes, performing index-to-data traversals, data-to-index traversals, and index-to-index traversals. Additionally, a query optimizer can be tuned to utilize such statistics and index traversals to explore one or more additional options to execute a query.

As noted, at least one embodiment of the invention can be implemented in connection with carrying out exploratory queries on knowledge graphs such as simple range queries, path queries with constraints, statistics queries, neighborhood queries, reachability queries, etc. Moreover, as detailed herein, one or more embodiments of the invention include speeding-up and/or accelerating query process via generating and implementing indexes in databases. Specifically, at least one embodiment of the invention includes adapting a tree representation of an index directly within a graph database. In such an embodiment, one or more tree- and/or graph-based indexing techniques can be adopted, and there is no need for separate indexing systems.

Additionally, one or more embodiments of the invention can include reusing graph traversal optimization techniques in a graph database management system (GDBMS), as well as re-using a graph traversal language and/or a query traversal pipeline. Re-using existing pipelines can, for example, ensure that no new or additional component has to be installed in the cluster, and remaining within the graph system can lead to better cache utilization and query processing. Further, the techniques detailed herein can be extensible to create multi-dimensional, adaptive indexing schemes. Accordingly, at least one embodiment of the invention can include providing a larger scope for query-optimization with traversals. By way of example, such traversals can include index-to-data traversals (a common form of traversal in relational and other settings), data-to-index traversals (with the reverse edge, a data value points to a location in an ordered list of values), index-to-index traversals (directly moving from a location from an ordered list to another ordered list (for example, a multi-dimensional index)), and data-to-index-to-data traversals (which include traversing two or more data records through an index, specifically moving from data to index and back to the data).

Also, in a relational database management system (RDMS), indexes are independent. Via one or more embodiments of the invention, users can correlate any internal nodes in one index with other data and/or another index using edges. Edges can have user-defined semantics that are used in query processing. In such an embodiment, as an extension to the graph model wherein the user can capture relationships that capture differences between data entities, the user can adopt the same strategy for relationships between index entities. In one example, the user can capture just the count of the edges between two index entities, or the complete set of edge identifiers connecting the data between edge entities. Edges can be utilized between index components, and different indexes can be enabled. For example, by creating edges between two single-dimensional indexes, one or more embodiments of the invention can include creating multi-dimensional indexes. Accordingly, enabling different indexes, as used herein, refers to creating a different type of indexes.

As noted above, at least one embodiment of the invention can include providing a larger scope for query-optimization with traversals such as index-to-data traversals. As an illustration of such a traversal, consider the example query of in what percentile is the monthly salary of employee X? Using an internal index, one or more embodiments of the invention can include starting from employee X, moving up the salary index, and counting a number of vertices to the left or right. The number of vertices to the left or right can be counted, for example, by maintaining information representing the number of vertices in the left and right sub-tree, respectively. Such an embodiment can include $\log_k(n)$ vertex traversals to determine an index root versus conducting full attribute scans.

Additionally, at least one embodiment of the invention can include aggregating statistics using one or more indexes. By way merely of illustration, consider an example query that aims to compute, for employees in the top ten percentile of salary, their percentile with respect to their experience. In response to such a query, one or more embodiments of the invention can include utilizing both indexes (the salary index and the experience index) for answering the query.

Also, at least one embodiment of the invention can include adaptive indexing, which includes creating on-the-fly indexes on parts that are being queried. As used here, "parts" represent the sub-graph of the original data graph that is accessed to return the results of the query. If a query includes a filter condition on a specific type (label) of nodes, then one or more embodiments of the invention can include building an index only for the nodes of those specific types. Additionally, for example, such an embodiment can include generating one or more path indexes, which can be similar to materialized views, but are extendible as more parts of the graph are traversed.

FIG. 1 is a block diagram of a computer network configured for schema-free in-graph indexing in an illustrative embodiment of the invention. By way of illustration, FIG. 1 depicts a computer network 100 configured in accordance with an illustrative embodiment of the invention. The computer network 100 comprises a plurality of user devices 102-1, 102-2, . . . 102-K, collectively referred to herein as user devices 102. The user devices 102 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1 embodiment. Also coupled to the network 104 is a query processing system 105.

The user devices 102 may comprise, for example, mobile telephones, laptop computers, tablet computers, desktop computers or other types of computing devices. Such devices are examples of what are more generally referred to herein as "processing devices." Some of these processing devices are also generally referred to herein as "computers."

The user devices 102 in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

The query processing system 105 has an associated database 106, which is configured to store knowledge graph data 107. In one or more embodiments of the invention, knowledge graph data 107 can include any type of multi-attributes graphs, wherein properties and/or attributes can be used to capture information about entities and relationships.

The database 106 in the present embodiment is implemented using one or more storage systems associated with the query processing system 105. Such storage systems can comprise any of a variety of different types of storage including network-attached storage (NAS), storage area networks (SANs), direct-attached storage (DAS) and distributed DAS, as well as combinations of these and other storage types, including software-defined storage.

Also associated with the query processing system 105 are input-output devices 108, which illustratively comprise keyboards, displays or other types of input-output devices in any combination. Such input-output devices are used to support one or more user interfaces to the query processing system 105, as well as to support communication between the query processing system 105 and other related systems and devices not explicitly shown.

The query processing system 105 in the FIG. 1 embodiment is assumed to be implemented using at least one processing device. Each such processing device generally comprises at least one processor and an associated memory, and implements one or more functional modules for controlling certain features of the query processing system 105.

More particularly, the query processing system 105 in this embodiment comprises a processor 120 coupled to a memory 122 and a network interface 124.

The processor 120 illustratively comprises a microprocessor, a microcontroller, an application-specific integrated circuit (ASIC), a field-programmable gate array (FPGA) or other type of processing circuitry, as well as portions or combinations of such circuitry elements.

The memory 122 illustratively comprises random access memory (RAM), read-only memory (ROM) or other types of memory, in any combination. The memory 122 and other memories disclosed herein may be viewed as examples of what are more generally referred to as "processor-readable storage media" storing executable computer program code or other types of software programs.

One or more embodiments of the invention include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals.

The network interface 124 allows the query processing system 105 to communicate over the network 104 with the user devices 102, and illustratively comprises one or more conventional transceivers.

The processor 120 further comprises an index generator 130, an index correlator 132, and a traversal generator 134. As further detailed herein, the index generator 130 creates one or more schema-free (heterogeneous) indexes that point to particular data (vertices and/or edges of a knowledge graph). Specifically, on a given knowledge graph, an attribute associated with vertices of the graph can be indexed, for example, in a form similar to a B-Tree. By way of illustration, consider an example implementation wherein values of a "salary" attribute of all vertices labeled "Employee" can be indexed. The root node of the created index represents the entire range of salary values, and sub-nodes can provide access to finer precision ranges of indexed data values. Additionally, another level (the last level, in one or more embodiments of the invention) can include the leaf node in the tree, which points to the vertices (data) of the graph.

It should be noted and appreciated that attribute indexes, such as described above, are one type of index, and embodiments of the invention can include generating and utilizing other types of indexes such as, for example, path indexes, edge cuts, etc. Additionally, nodes of trees can also be customized to capture different statistics, such as, for example, count, average, etc. Further, in accordance with one or more embodiments of the invention, such statistics can be used in query processing. By way of example, suppose an index is created over the "age" properties of "employee" vertices, and a query requires the grouping of employees based on their age and identifying the average salary of employees in each group. Accordingly, in such an example, each age index node can hold average salary information for that particular age. Further, the query can be answered by accessing the age index only, and the age index nodes can be accessed starting from the root node of the index tree, and the average salary can be shown as an output stored in the index nodes.

The index correlator 132 correlates multiple indexes (such as multi-dimensional and adaptive indexes) that can be stored as graphs. Once single-dimensional indexes have been created, such indexes can be correlated (via index correlator 132) to create one or more multi-dimensional indexes. By way of illustration, and referring to the previously noted example, nodes of the "salary" index can be linked with nodes of an "organization" index, to capture the number of employees within a given salary range in a given organization. Further, in one or more embodiments of the invention, an annotated can also be created, for example, by recording not only the number of employees, but the employee identifiers (IDs) on each of the relevant edges to accelerate query processing.

The traversal generator 134 uses one or more data-to-index traversals and/or one or more index-to-index traversals to accelerate query processing. By way of example, instead of starting from the root of indexes, data-to-index links can be generated and used for aggregate queries such as, for instance, "in what percentile is employee X's salary?" Index-to-index traversals can also be generated and used for queries involving one or more filtering conditions on multiple attributes. For example, a filtering condition might include employees less than 30 years of age and having a salary in the upper half (that is, greater than the average salary) of all salaries within the group. In such an example, query execution can start from an age index to obtain all employee nodes of age less than 30 (index-to-data); then, from these data nodes, a salary index can be accessed (data-to-index). In the salary index, such an example embodiment of the invention can include determining whether index node's left part of the tree contains more nodes than the right part (for greater than the average salary condition).

It is to be appreciated that this particular arrangement of modules 130, 132, and 134 illustrated in the processor 120 of the FIG. 1 embodiment is presented by way of example only, and alternative arrangements can be used in other embodiments. For example, the functionality associated with the modules 130, 132, and 134 in other embodiments can be combined into a single module, or separated across a larger number of modules. As another example, multiple distinct processors can be used to implement different ones of the modules 130, 132, and 134 or portions thereof.

At least portions of the index generator 130, index correlator 132, and traversal generator 134 may be implemented at least in part in the form of software that is stored in memory 122 and executed by processor 120.

It is to be understood that the particular set of elements shown in FIG. 1 for accelerating query processing involving user devices 102 of computer network 100 is presented by way of illustrative example only, and in other embodiments additional or alternative elements may be used. Thus, another embodiment may include additional or alternative systems, devices and other network entities, as well as different arrangements of modules and other components.

By way of example, in other embodiments, the query processing system 105 can be eliminated and associated elements such as index generator 130, index correlator 132, and traversal generator 134 can be implemented elsewhere in the computer network 100.

An exemplary process utilizing index generator 130, index correlator 132, and traversal generator 134 of the query processing system 105 in computer network 100 will be described in more detail with reference to the flow diagram of FIG. 2.

Figure 2:
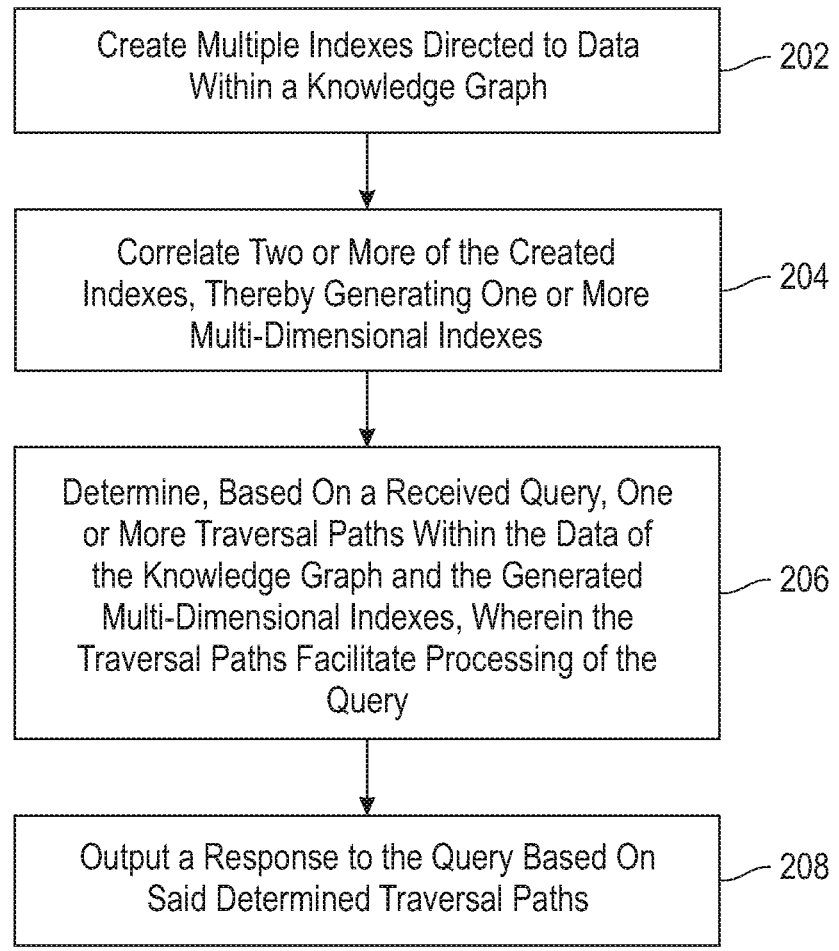
FIG. 2 is a flow diagram illustrating techniques according to an embodiment of the invention.

FIG. 2 is a flow diagram illustrating techniques according to an embodiment of the present invention. Step 202 includes creating multiple indexes directed to data within a knowledge graph. Creating can include creating one or more indexes directed to one or more data paths within the knowledge graph and/or one or more indexes directed to one or more data attributes within the knowledge graph. Additionally, the one or more data attributes within the knowledge graph can include one or more data attributes associated with one or more vertices of the knowledge graph and/or one or more data attributes associated with one or more edges of the knowledge graph.

Further, the created indexes can include schema-free indexes. Also, the root node of each created index can include a representation of a range of values associated with the given data attribute. Additionally, one or more sub-nodes of the root node can include a narrower range of values associated with the given data attributed than the range associated with the root node.

Step 204 includes correlating two or more of the created indexes, thereby generating one or more multi-dimensional indexes. At least one embodiment of the invention can also include annotating the generated multi-dimensional indexes with one or more items of information related to the data within the multi-dimensional indexes. Additionally, one more embodiments of the invention can include storing the generated multi-dimensional indexes as one or more graphs.

Step 206 includes determining, based on a received query, one or more traversal paths within the data of the knowledge graph and the generated multi-dimensional indexes, wherein the traversal paths facilitate processing of the query. The one or more traversal paths can include one or more data-to-index traversal paths and/or one or more index-to-index traversal paths. Step 208 includes outputting a response to the query based on said determined traversal paths.

Also, an additional embodiment of the invention includes obtaining a query pertaining to data encompassed within a knowledge graph, creating multiple single-dimension indexes directed to data within the knowledge graph, and correlating, based on the query, two or more of the created single-dimension indexes, thereby generating one or more multi-dimensional indexes. Such an embodiment can also include determining, based on the query, one or more traversal paths within the data of the knowledge graph and the generated multi-dimensional indexes, wherein the traversal paths facilitate identification of a response to the query, and outputting the response to the query to at least one user.

The techniques depicted in FIG. 2 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an embodiment of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 2 can be implemented via a computer program product that can include computer useable program code that is stored in a computer readable storage medium in a data processing system, and wherein the computer useable program code was downloaded over a network from a remote data processing system. Also, in an embodiment of the invention, the computer program product can include computer useable program code that is stored in a computer readable storage medium in a server data processing system, and wherein the computer useable program code is downloaded over a network to a remote data processing system for use in a computer readable storage medium with the remote system.

An embodiment of the invention or elements thereof can be implemented in the form of an apparatus including a memory and at least one processor that is coupled to the memory and configured to perform exemplary method steps.

Figure 3:
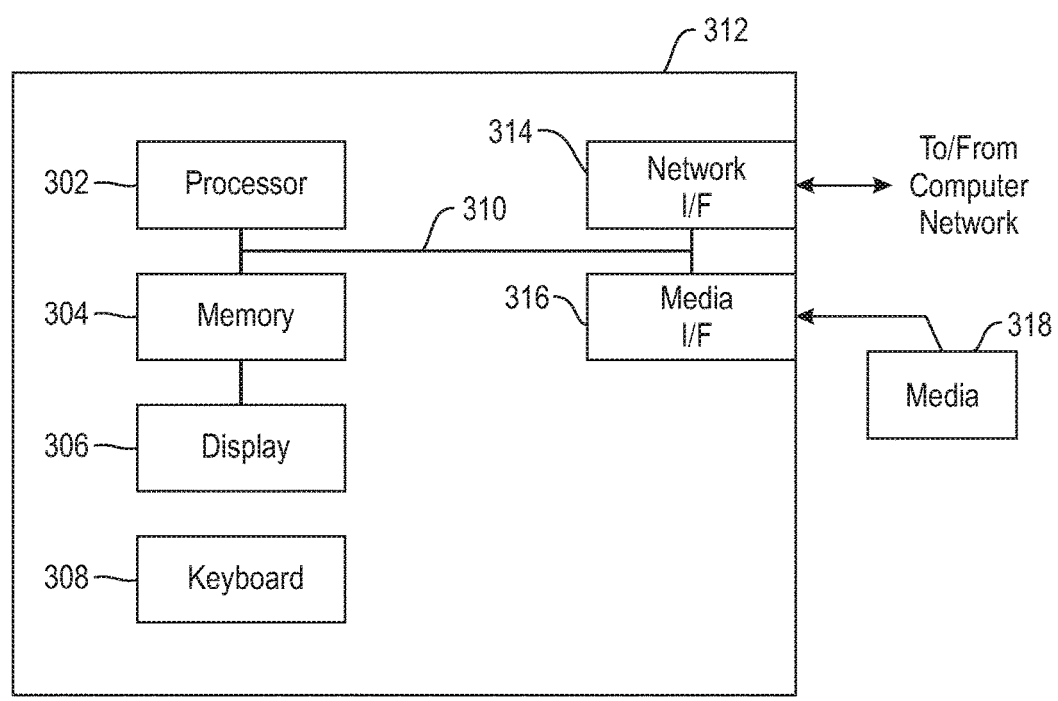
FIG. 3 is a system diagram of an exemplary computer system on which at least one embodiment of the invention can be implemented.

Additionally, an embodiment of the present invention can make use of software running on a computer or workstation. With reference to FIG. 3, such an implementation might employ, for example, a processor 302, a memory 304, and an input/output interface formed, for example, by a display 306 and a keyboard 308. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 302, memory 304, and input/output interface such as display 306 and keyboard 308 can be interconnected, for example, via bus 310 as part of a data processing unit 312. Suitable interconnections, for example via bus 310, can also be provided to a network interface 314, such as a network card, which can be provided to interface with a computer network, and to a media interface 316, such as a diskette or CD-ROM drive, which can be provided to interface with media 318.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 302 coupled directly or indirectly to memory elements 304 through a system bus 310. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including, but not limited to, keyboards 308, displays 306, pointing devices, and the like) can be coupled to the system either directly (such as via bus 310) or through intervening I/O controllers (omitted for clarity).

Network adapters such as network interface 314 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 312 as shown in FIG. 3) running a server program. It will be understood that such a physical server may or may not include a display and keyboard.

The present invention may be a system, a method, and/or a computer program product at any possible technical detail level of integration. The computer program product may include a computer readable storage medium (or media) having computer readable program instructions thereon for causing a processor to carry out embodiments of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform embodiments of the present invention.

Embodiments of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 302. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed digital computer with associated memory, and the like. Given the teachings of the invention provided herein, one of ordinary skill in the related art will be able to contemplate other implementations of the components of the invention.

Additionally, it is understood in advance that implementation of the teachings recited herein are not limited to a particular computing environment. Rather, embodiments of the present invention are capable of being implemented in conjunction with any type of computing environment now known or later developed.

For example, cloud computing is a model of service delivery for enabling convenient, on-demand network access to a shared pool of configurable computing resources (for example, networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (for example, country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (for example, storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (for example, web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (for example, host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (for example, mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (for example, cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
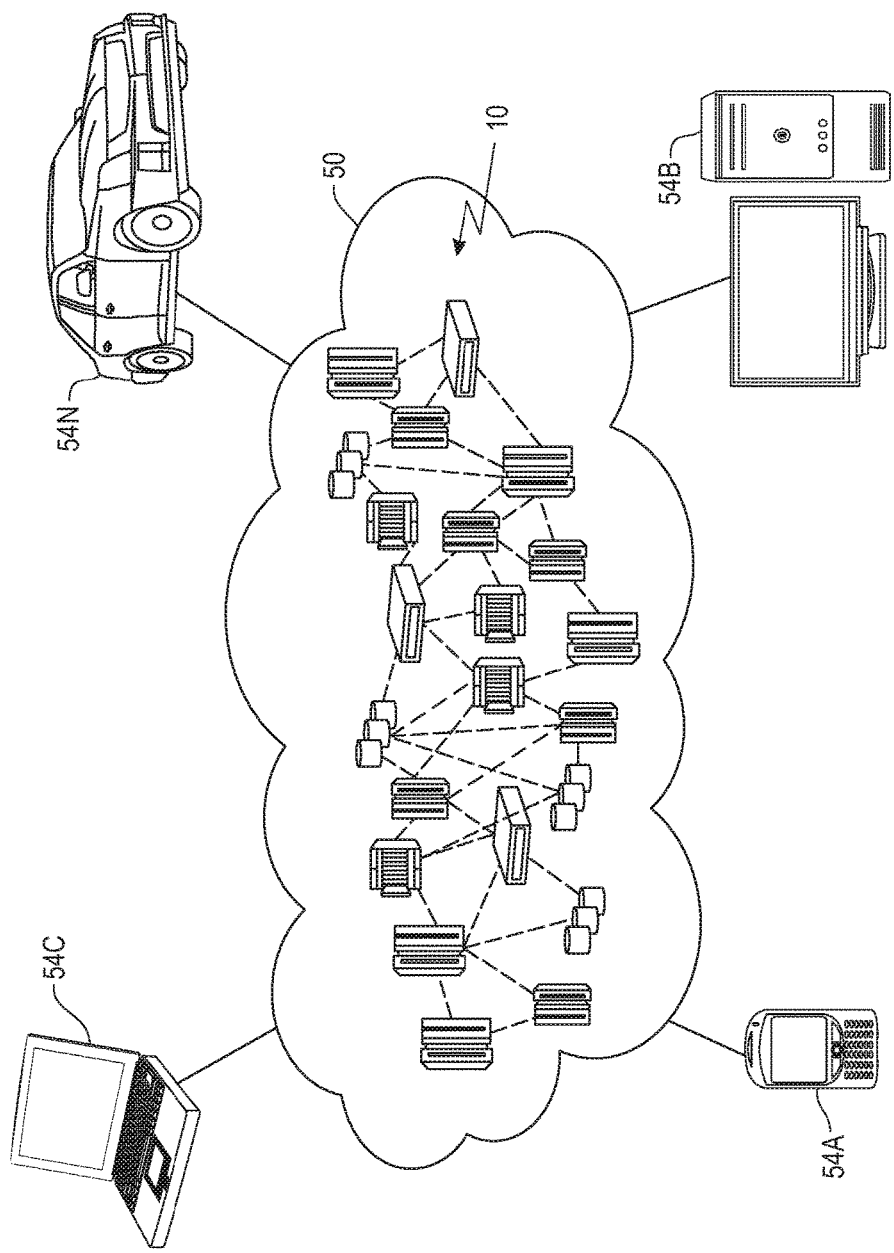
FIG. 4 depicts a cloud computing environment according to an embodiment of the present invention.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
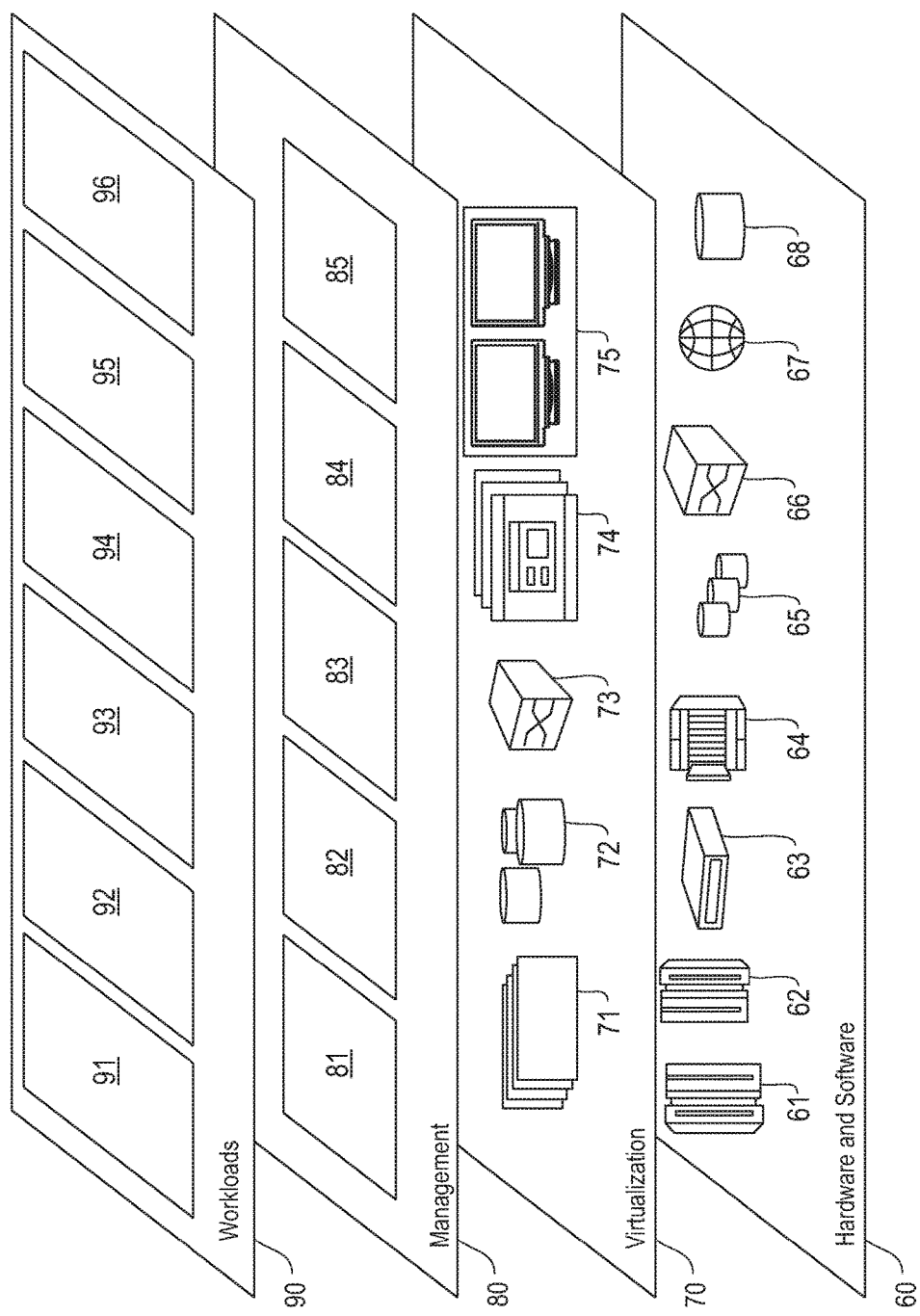
FIG. 5 depicts abstraction model layers according to an embodiment of the present invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75. In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources.

In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and schema-free in-graph indexing 96, in accordance with the one or more embodiments of the present invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of another feature, step, operation, element, component, and/or group thereof.

At least one embodiment of the present invention may provide a beneficial effect such as, for example, correlating multiple indexes to create multi-dimensional indexes.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   creating multiple indexes directed to data within a knowledge graph, wherein each of the multiple indexes is created as a graph;
   correlating at least a first created index and at least a second created index by linking one or more nodes of the first created index with one or more nodes of the second created index, thereby generating one or more multi-dimensional indexes;
   determining, based on a received query, one or more traversal paths within the data of the knowledge graph and the generated multi-dimensional indexes, wherein the one or more traversal paths comprise one or more data-to-index traversal paths and facilitate processing of the query; and outputting a response to the query based on said determined one or more traversal paths;

wherein the steps are carried out by at least one computing device.

2. The computer-implemented method of claim 1, wherein said creating comprises creating one or more indexes directed to one or more data attributes within the knowledge graph.

3. The computer-implemented method of claim 2, wherein the one or more data attributes within the knowledge graph comprise one or more data attributes associated with one or more nodes of the knowledge graph.

4. The computer-implemented method of claim 2, wherein the one or more data attributes within the knowledge graph comprise one or more data attributes associated with one or more edges of the knowledge graph.

5. The computer-implemented method of claim 1, wherein the created indexes comprise schema-free indexes.

6. The computer-implemented method of claim 1, wherein the root node of each created index comprises a representation of a range of values associated with a given data attribute.

7. The computer-implemented method of claim 6, wherein one or more sub-nodes of the root node comprise a narrower range of values associated with the given data attribute than the range associated with the root node.

8. The computer-implemented method of claim 1, wherein said creating comprises creating one or more indexes directed to one or more data paths within the knowledge graph.

9. The computer-implemented method of claim 1, comprising:

annotating the generated multi-dimensional indexes with one or more items of information related to the data within the multi-dimensional indexes.

10. The computer-implemented method of claim 1, comprising:

storing the generated multi-dimensional indexes within the knowledge graph.

11. A computer program product comprising a computer readable storage medium having program instructions embodied therewith, the program instructions executable by a device to cause the device to:

create multiple indexes directed to data within a knowledge graph, wherein each of the multiple indexes is created as a graph;

correlate at least a first created index and at least a second created index by linking one or more nodes of the first created index with one or more nodes of the second created index, thereby generating one or more multi-dimensional indexes;

determine, based on a received query, one or more traversal paths within the data of the knowledge graph and the generated multi-dimensional indexes, wherein the one or more traversal paths comprise one or more data-to-index traversal paths and facilitate processing of the query; and output a response to the query based on said determined one or more traversal paths.

12. A system comprising:

a memory; and at least one processor operably coupled to the memory and configured for:

creating multiple indexes directed to data within a knowledge graph, wherein each of the multiple indexes is created as a graph;

correlating at least a first created index and at least a second created index by linking one or more nodes of the first created index with one or more nodes of the second created index, thereby generating one or more multi-dimensional indexes;

determining, based on a received query, one or more traversal paths within the data of the knowledge graph and the generated multi-dimensional indexes, wherein the one or more traversal paths comprise one or more data-to-index traversal paths and facilitate processing of the query; and outputting a response to the query based on said determined one or more traversal paths.

13. A computer-implemented method, comprising:

obtaining a query pertaining to data encompassed within a knowledge graph;

creating multiple single-dimension indexes directed to data within the knowledge graph, wherein each of the single-dimension indexes is created as a graph;

correlating, based on the query, two or more of the created single-dimension indexes by linking one or more nodes of at least a first created single-dimension index with one or more nodes of at least a second created single-dimension index, thereby generating one or more multi-dimensional indexes;

determining, based on the query, one or more traversal paths within the data of the knowledge graph and the generated multi-dimensional indexes, wherein the one or more traversal paths comprise one or more index-to-index traversal paths and facilitate identification of a response to the query; and outputting the response to the query to at least one user;

wherein the steps are carried out by at least one computing device.

14. The computer-implemented method of claim 13, wherein the created single-dimension indexes comprise schema-free indexes.

15. The computer-implemented method of claim 13, wherein said creating comprises creating one or more single-dimension indexes directed to one or more data attributes within the knowledge graph.

16. The computer-implemented method of claim 13, wherein said creating comprises creating one or more single-dimension indexes directed to one or more data paths within the knowledge graph.

* * * * *